(No Model.) 2 Sheets—Sheet 1.
J. H. ADAMSON.
ROTARY SEED SOWER.
No. 396,251. Patented Jan. 15, 1889.
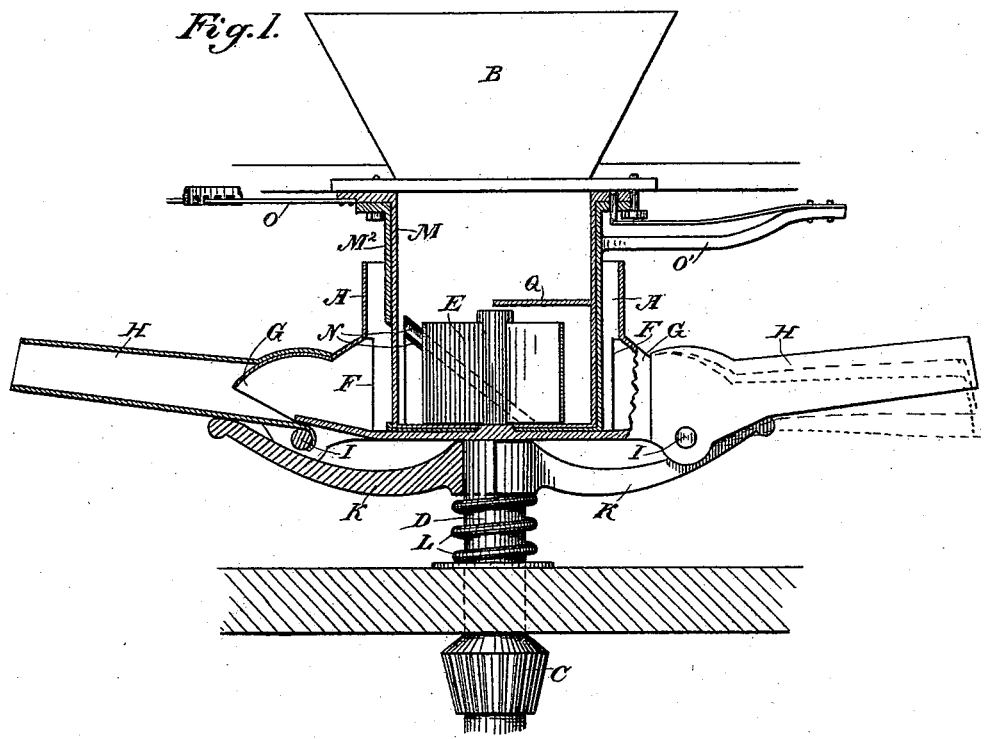
Witnesses,
Geo. H. Strong.
Inventor,
J. H. Adamson
By Dewey & Co
atty (No Model.) 2 Sheets—Sheet 2.
J. H. ADAMSON.
ROTARY SEED SOWER.
No. 396,251. Patented Jan. 15, 1889.
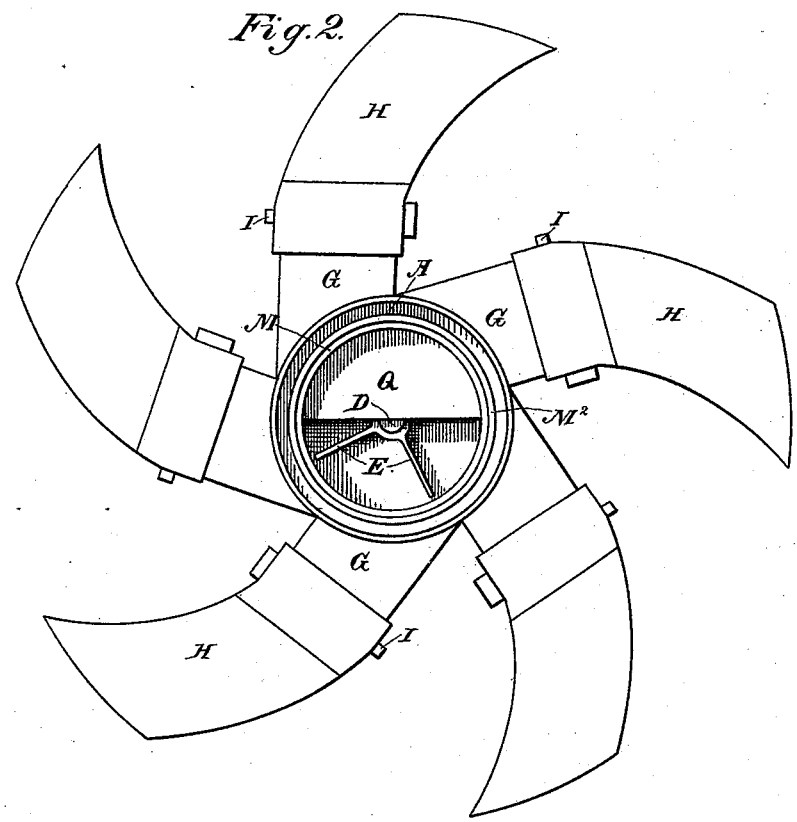
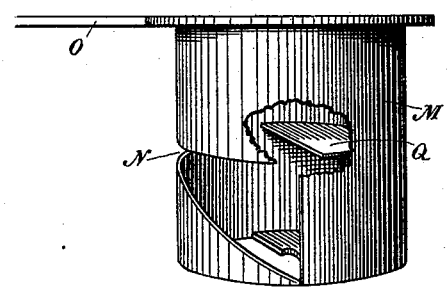
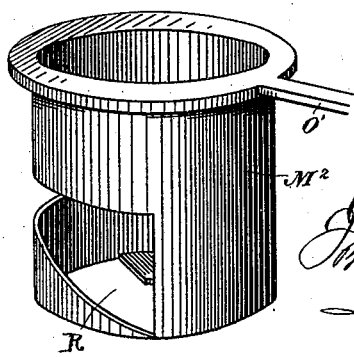
Witnesses,
Geo. H. Strong.
J. H. Rouse.
Inventor,
J. H. Adamson
By Dewey & Co.
attys

United States Patent Office.

JAMES HAZEL ADAMSON, OF NORTH MELBOURNE, VICTORIA, AUSTRALIA.

ROTARY SEED-SOWER.

SPECIFICATION forming part of Letters Patent No. 396,251, dated January 15, 1889.

Application filed September 21, 1888. Serial No. 286,039. (No model.) Patented in Victoria March 20, 1884, No. 3,687; in South Australia July 7, 1887, No. 814, and in New South Wales November 17, 1887, No. 340.

*To all whom it may concern:*

Be it known that I, JAMES HAZEL ADAMSON, of North Melbourne, Colony of Victoria, Australia, have invented an Improvement in Rotary Seed-Sowers, (for which I have obtained Letters Patent in the following countries, viz: Victoria, March 20, 1884, No. 3,687; South Australia, July 7, 1887, No. 814, and New South Wales, November 17, 1887, No. 340;) and I hereby declare the following to be a full, clear, and exact description of the same.

My invention relates to certain improvements in rotary seed-sowers; and it consists in making the distributer of the rotary seed-sower adjustable, so as to equalize the area over which the seed is cast while the machine is driven at varying speed.

It also consists in the construction of a feed-box so that it can be easily adjusted to sow different widths and secure a more uniform distribution of the seed over the land.

Referring to the accompanying drawings for a more complete explanation of my invention, Figure 1 is a side elevation of a part of the machine, showing a portion in vertical section. Fig. 2 is a plan view. Fig. 3 is a side elevation showing a modification of the device. Figs. 4 and 5 are detailed views of the feed-box.

A is the chamber into which the seed is discharged from the hopper B, and this chamber is set in rapid revolution about the vertical axis by means of the pinion C upon the vertical spindle D, the motion being transferred to the pinion from the bearing-wheels of the vehicle or machine upon which the seed-sower is carried.

Within the chamber A is a broad-blade feed-wheel, E, which throws the seed outwardly through the series of openings F, and thence into the discharge tubes or spouts H. Around the chamber A are a series of short flanges or nozzles, G, and the spouts H are so constructed as to be hinged or supported from the lower sides of these nozzles, and are held so that when the device is stationary they will point slightly above a horizontal plane. These spouts are held up either by arms K, supported upon a spiral spring, L, which surrounds the shaft C, or, as shown in Fig. 3, they may be attached to an elastic disk, K, which extends beneath their lower sides and to which they are secured. The rapid rotation of the chamber A and the weight of the spouts will cause the outer ends of the spouts to be depressed, moving about their points of suspension I on the lower side, and the greater the centrifugal force the lower these outer discharge ends will be depressed. When the team is driven very slowly, the centrifugal force becomes less and the outer ends of the spouts will rise again. By this operation, when the team is driven slowly, as the spouts point slightly upward, they will be in a position to throw the grain to a greater distance with a slow rate of speed; but when the speed increases and the grain is thrown out with greater velocity the points of the spouts are depressed by the increased speed, so that the grain will be thrown to about the same distance as when the machine is driven slowly, and they thus serve to regulate or equalize the discharge over the desired area.

In order to overcome the difficulty of sowing different thickness of seed in one cast, and usually more to one side than the other on account of wind or other causes, I employ a central tube, M, fixed inside of the distributer, and having an angular opening, N, formed in one side, through which the seed is thrown by the feed-wheel E, above referred to. The tube M has a lever or handle, O, attached to it, and by turning it round the relative position is changed so as to govern and regulate the discharge of the grain through it. I have in the present case shown a triangular opening for this purpose; but I do not desire to confine myself to such an opening, as a series of holes or openings of a different shape might be formed to produce the same result. Above the feed-wheel E, within the cylinder M, is fixed a diaphragm, Q, which covers about half the diameter of the cylinder, allowing the seed to descend through the front half into the space between the leaves of the feed-wheel E. By feeding the seed thus into one side of the cylinder the apparatus is prevented from throwing the seed into the cart or vehicle upon which the machine is carried and worked.

In order to regulate the direction in which the seed is thrown with greater precision, I employ a second tube, $M^2$, which is placed exterior to the tube M, this second tube being shown more plainly in Fig. 5. This exterior tube has also a triangular opening made in it of the same size and form as that in the tube M, as shown at R, and by means of a handle, O', this tube may also be adjusted with relation to the tube M, so as to still more circumscribe the direction and space over which the seed is thrown by increasing or diminishing the opening through which it escapes. This is especially useful in sowing narrow widths. The discharge spouts or pipes may be made square, round, oval, or of any suitable or desired shape, and, as before described, they may be attached by springs at their lower sides to the chamber; or the bottom of the chamber itself may be formed of thin elastic plate, to which the spouts may be attached, thus avoiding the use of pivots and independent springs.

Having thus described my invention, what I claim as new, and desire to secure by Letters Patent, is—

1. In a seed-sower, a central distributing-chamber having the openings around its sides, in combination with the correspondingly-arranged tubes or spouts hinged or supported in line with these openings, so that their outer ends will rise or be depressed with the varying velocity of rotation and the area of seed-distribution be regulated, substantially as herein described.

2. A series of distributing spouts or tubes having their lower sides pivoted or flexibly attached to the seed-distributing chamber, in combination with springs by which the outer ends of the tubes are raised when at rest or moving slowly, said springs having such a tension that as the speed increases the centrifugal force will depress the outer ends of the spouts, substantially as herein described.

3. The central chamber receiving seed from the hopper or source of supply, and the rotary feed-wheel by which the seed is discharged through the openings in the side of the chamber, in combination with the series of corresponding discharge and distributing arms having their lower sides supported by springs or spring-actuated arms, so that when moving slowly the discharge will be in a direction above the horizontal plane, while a rapid rotation will cause the mouths of the tubes to be depressed in a degree corresponding to the speed at which they are rotating, substantially as herein described.

4. The cylindrical chamber with the discharge-openings, the hinged distributing-pipes automatically adjustable by centrifugal movement, and the feed-wheel by which the seed is ejected from the chamber, in combination with one or more adjustable cylinders placed within the chamber A, and having openings whereby the direction in which the seed is discharged is controlled, substantially as herein described.

In witness whereof I have hereunto set my hand.

JAMES HAZEL ADAMSON.

Witnesses:
JAMES FLATLEY,
JOSEPH H. BUSH.